United States Patent [19]
Hall, Jr.

[11] Patent Number: 5,791,714
[45] Date of Patent: Aug. 11, 1998

[54] FLOOR SYSTEM FOR TOWABLE HORSE TRAILERS

[75] Inventor: Roland K. Hall, Jr., Bokchito, Okla.

[73] Assignee: Sundowner Trailers, Inc., Coleman, Okla.

[21] Appl. No.: 698,786

[22] Filed: Aug. 16, 1996

[51] Int. Cl.$^6$ .................................................... B60P 3/05
[52] U.S. Cl. ............................................ 296/24.2; 296/182
[58] Field of Search ................................ 296/24.2, 181, 296/182, 183, 197, 29, 146.8, 146.9, 161

[56] References Cited

U.S. PATENT DOCUMENTS

| | | | |
|---|---|---|---|
| 2,841,437 | 7/1958 | Turpin, Jr. ........................... | 296/24.2 |
| 2,926,928 | 3/1960 | Bennett ................................ | 296/182 X |
| 3,116,950 | 1/1964 | Chieger et al. ...................... | 296/24.2 |
| 4,530,538 | 7/1985 | Greene, Jr. et al. ................. | 296/24.2 |
| 4,951,992 | 8/1990 | Hockney .............................. | 296/181 X |
| 5,351,990 | 10/1994 | Thomas ............................... | 296/182 X |
| 5,403,063 | 4/1995 | Sjostedt et al. ..................... | 296/181 X |

*Primary Examiner*—Joseph D. Pape
*Attorney, Agent, or Firm*—Baker & Daniels

[57] ABSTRACT

An end unit for use on vehicles having modular floors, such as truck beds, trailers, and the like. The end unit according to the present invention includes a load bearing portion having an integrated reinforcing rib that extends along the edge of the load bearing portion that stiffens the load bearing portion against point loads and impact loads. The end unit also includes a resilient bumper attached to the edge of the load bearing portion in engagement with the reinforcing rib, and a sealing member that seals the interface between the bumper and the end unit that seals the interface against the entry of moisture and contaminants. The reinforcing rib includes an elongated cavity which protects the bumper attachment hardware from rust, dirt and corrosion.

26 Claims, 3 Drawing Sheets

FLOOR SYSTEM FOR TOWABLE HORSE TRAILERS

The present invention relates generally to an improved interlocking modular floor system for towable vehicles such as horse trailers. Specifically, the present invention relates to an improved modular floor system having a stronger, stiffer reinforced end unit that reduces flexing at the loading end of the trailer, and a resilient bumper that attaches directly to the end unit in order to minimize the chances of impact related damage to the end unit or the floor itself. Finally, the present invention includes a continuous rigid interlocking sealing member that prevents dirt, manure, and other materials from contaminating the joint between the bumper and the end unit, thereby preventing corrosion and other deterioration.

BACKGROUND OF THE INVENTION

Trailers for horses and other large animals are generally well known in the art. Many of these trailers are built to carry very heavy loads, including two, four, six or more horses, and including all of the tack and equipment for the horses. Some of these trailers even include temporary living space for the horse owners. However, the need for increased fuel efficiency in all motor vehicles has driven manufacturers to make all kinds of trailers, including horse trailers, more aerodynamic and lighter, and accordingly more fuel efficient. However, these new lighter horse trailers must not sacrifice strength, especially the strength of the frame and the floor.

One approach to reduce the weight of horse trailers is to manufacture components out of aluminum, which is significantly lighter than steel and does not rust. Aluminum has the added benefit of being extrudable, and therefore many standard components can be manufactured very economically. Unfortunately, aluminum does not have the stiffness or the failure strength of steel. Therefore, aluminum floor components must be highly engineered in order to Contain maximum performance.

One approach has been to manufacture the trailer floor system from interlocking extruded floor panels. The interlocking panels are economical to produce, easy to assemble, and strong and stiff enough for almost any application. Typically, these aluminum floor panels span the distance between the main frame rails of the trailer, running transverse to the trailer's normal direction of travel. Consequently, the fairly short span provides a firm, stiff floor, and the interlocking arrangement allows concentrated point loads, such as those due to a horse standing in the middle of the trailer, to be spread out and shared by the adjacent floor panels.

Unfortunately, these aluminum panels are more prone to impact damage than are comparable steel components, especially at the ends of the floor which must support loading ramps and which also must absorb impacts from other vehicles or from backing the trailer into a loading platform. The end sections of these modular aluminum floors are frequently subjected to other concentrated loads as well. For example, the cam latch for the trailer doors is normally secured to the last section of flooring. Although a separate brace could be attached through the flooring of the frame, weight would be increased and parts and labor costs would be higher. Furthermore, a horse being loaded or unloaded is likely to stand directly on the last floor section. Unlike the rest of the floor, the end sections are particularly vulnerable to point loads because there are fewer adjacent sections to share the load.

Accordingly, there exists a need for an improved end section for aluminum floored trailers that is sufficiently stiff and strong to absorb impacts and to support heavy point loads at the end of the trailer.

SUMMARY OF THE INVENTION

The improved modular interlocking trailer floor of the present invention solves each of the problems referred to above. The present invention combines a specially designed, reinforced extruded end section that interlocks with the traditional interlocking floor segments to provide a continuous uniform floor surface. The reinforced end unit is stronger and stiffer than the standard floor panels and is capable of withstanding the heavy point loads frequently applied at the end of a trailer. The end unit accommodates a resilient bumper member that serves to further absorb and minimize impact loads, so that the standard floor panels are isolated from the damaging effects of such loads. The present invention also includes a rigid interlocking sealing strip that further protects the end panel, and also serves to prevent dirt, mud, manure, etc. from contaminating the joint between the end panel and the resilient bumper.

The extruded reinforced end panel eliminates the need for external reinforcement, such as welding additional sections to a standard floor panel, because a reinforcing rib is extruded along with the floor portion in one integrated section. Welding aluminum sections is a very difficult operation, and unless great care is taken the final product is very likely to be warped. Thus, the end panel of the present invention, which requires no welding, ensures a flatter and more uniform floor surface. The integrated reinforcing rib also strengthens the floor in the vicinity of the door latch, thus lengthening the useful life of the trailer and the floor system. Finally, because the reinforced end panel has the same interlocking construction as the standard modular floor section, the end panel can be easily retrofitted to existing trailers.

Another benefit of the present invention is the rigid sealing strip that prevents dirt, manure, and other contaminants from entering the joint between the resilient bumper and the end panel. When a horse or other large animal steps on the resilient bumper, the bumper deforms slightly and pulls away from the end panel creating a small gap. This gap allows dirt, manure, mud, etc. to get wedged in between the end panel and the bumper, which can cause the bumper to eventually crack. Moreover, this area is extremely difficult to clean properly without removing the entire bumper. The contaminants are also likely to gradually corrode the mounting hardware, which weakens the bumper and may cause a dangerous failure. However, on the present invention the bumper mounting hardware is protected from external contamination and road grime by the enclosed section of the reinforcing rib, the sealing strip, and by the resilient bumper itself.

A resilient bumper is attached to the end panel, and has a mounting wall, an outer wall, and a hollow cross section, which enhances the protective features referred to above. The mounting wall is mounted directly to the reinforcing rib of the end panel by self tapping screws so that a lock washer and nut are not required and so that the ends of the screws are sealed within the hollow reinforcing rib. The outer wall of the bumper includes access holes to facilitate installation of the screws. After installation, the screw heads are located within the hollow section, substantially protected from corrosive elements by the outer wall. Consequently, the resilient bumper requires fewer parts and less labor to install than does a standard bumper, and will have a longer useful life.

Accordingly, it is an object of this invention to provide an interlocking modular floor system for trailers that has an improved, stronger end panel.

It is another object of this invention to provide an improved floor system for trailers that has a resilient bumper and a sealing strip that protects the bumper and seals the mounting hardware from contamination.

A still further object of this invention is to provide an integrated reinforced end panel for interlocking trailer floors that is better able to withstand heavy point loads than are standard floor panels.

Another object of this invention is to provide a modular floor system for trailers that is stiffer, flatter, more uniform, and better able to absorb impacts than are the prior art designs.

Other objects of the invention will become readily apparent to those skilled in the art upon a reading of the following description.

DETAILED DESCRIPTION OF THE INVENTION

The embodiment herein described is not intended to be exhaustive or to limit the invention to the precise form disclosed. It is chosen and described to explain the principles of the invention and its application and practical use to best enable others skilled in the art to follow its teachings.

Figure 1:
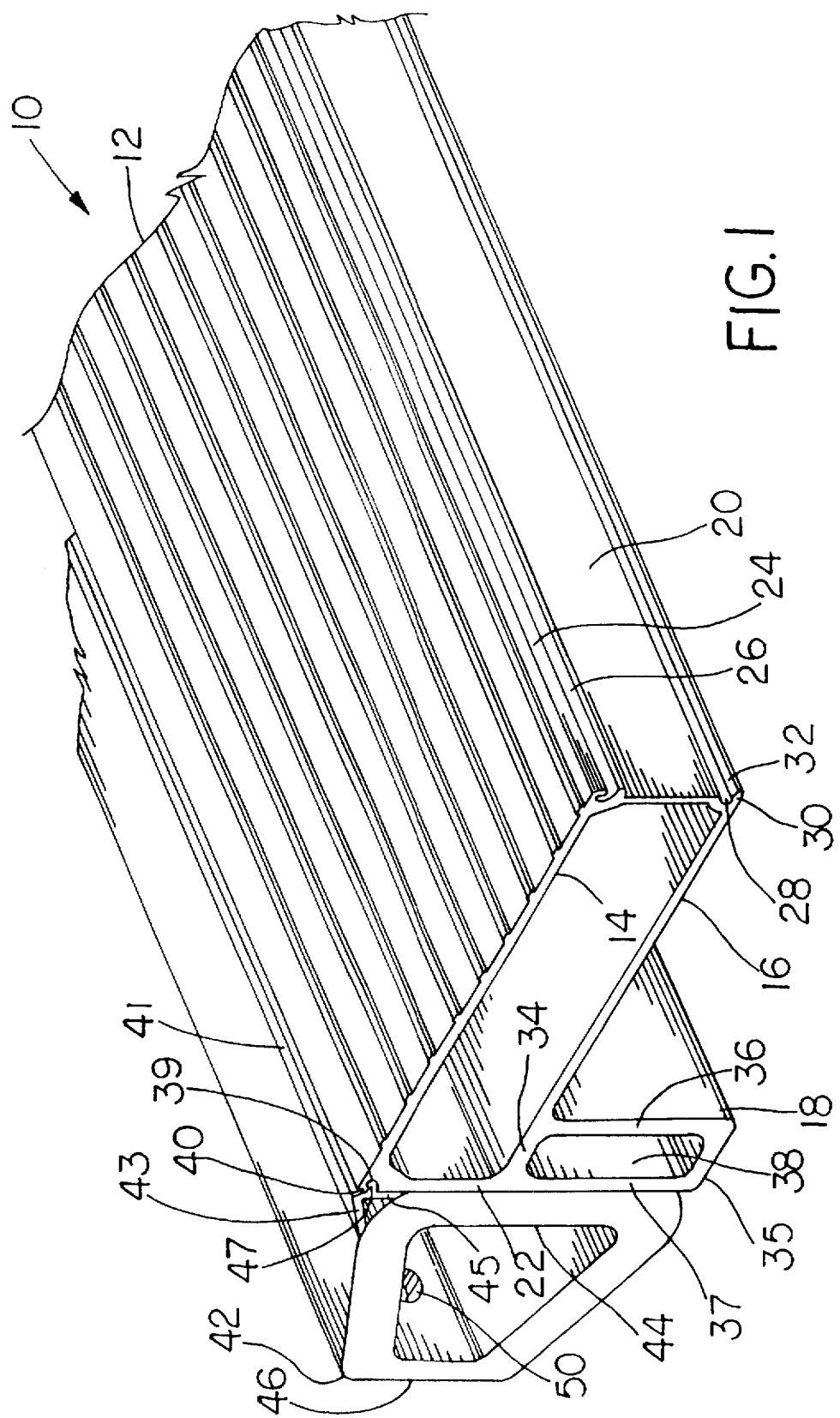
FIG. 1 is a fragmentary view in perspective of an improved end unit for a modular floor incorporating the features of the present invention.

Referring now to FIG. 1 of the drawings, a reinforced end panel according to the present invention is generally indicated by the reference numeral 10 includes a load bearing portion 12 having an upper surface 14, a lower surface 16, an attachment end 20 and bumper end 22 interconnecting upper surface 14 and lower surface 16, and a reinforcing rib 18 extending between lower surface 16 adjacent bumper end 22. End panel 10 is preferably a single piece of aluminum extruded according to common industry practices. The corner between attachment end 20 and upper surface 14 includes a lip 24 which cooperates with attachment end 20 to define a groove 26. Lip 24 and groove 26 engage and interlock with a complementary groove and lip structure on an adjacent modular floor panel 60 as is discussed in greater detail below. The lower corner between attachment end 20 and lower surface 16 includes a second groove 28 and defined between a lip 30 and a protrusion or detent 32. Groove 28 and lip 30 interlock with a complementary structure on modular floor panel 60 as is discussed in greater detail below. Reinforcing rib 18 includes top and bottom walls 34, 35, and inner and outer walls 36, 37. Outer wall 37 includes a plurality of bumper mounting holes 33 spaced at intervals along rib 18. Walls 34, 35, 36 and 37 define an inner cavity 38 within reinforcing rib 18. The corner between upper surface 12 and bumper end 22 includes a groove 39 which cooperates with bumper end 22 to define a lip 40, which engage and interlock with a complementary structure on sealing member 41, which includes a pair of legs 43, 45, and a locking tongue or lip 47 extending from leg 45. Sealing member 41 is preferably a rigid piece of extruded aluminum, although other firm, stiff materials may be substituted. Resilient bumper 42 includes a mounting wall 44 and an outer wall 46, and is attached to rib 18 as by self-tapping lag screws 49 as is known in the industry. Lag screws 49 preferably include a flat piece of bar stock or a large washer 53 to prevent the head of screw 49 from pulling through bumper 42. Resilient bumper 42 is preferably a continuous piece of molded rubber having good shock absorption capabilities. Outer wall 46 of bumper 42 includes access holes 50, while mounting wall 44 includes mounting holes 52 sized to accommodate lag screws 49.

Figure 2:
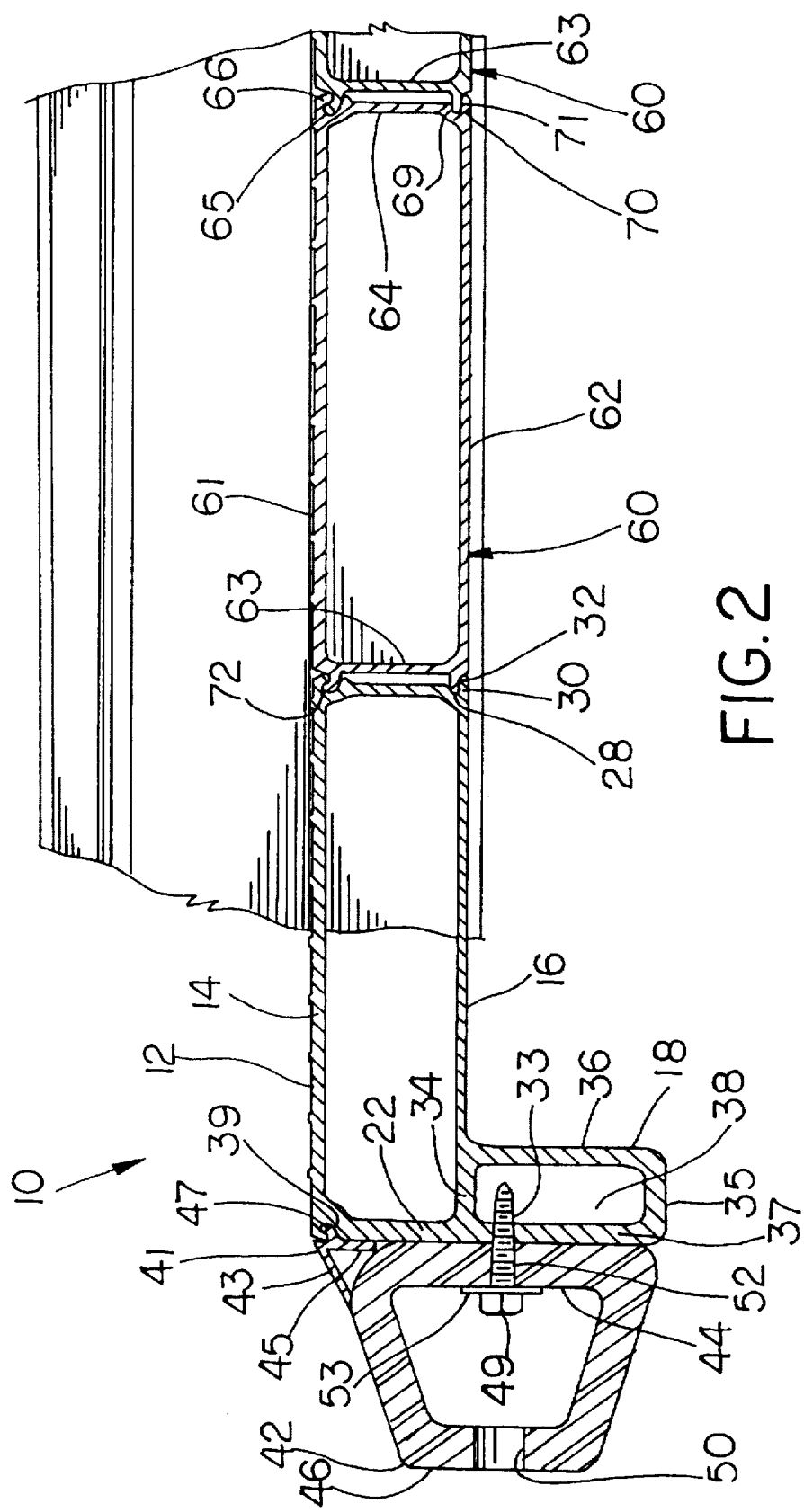
FIG. 2 is a fragmentary cross-sectional view of the improved end unit of the present invention shown attached to an interlocking modular floor system, taken along lines 2—2 of FIG. 3.
Figure 3:
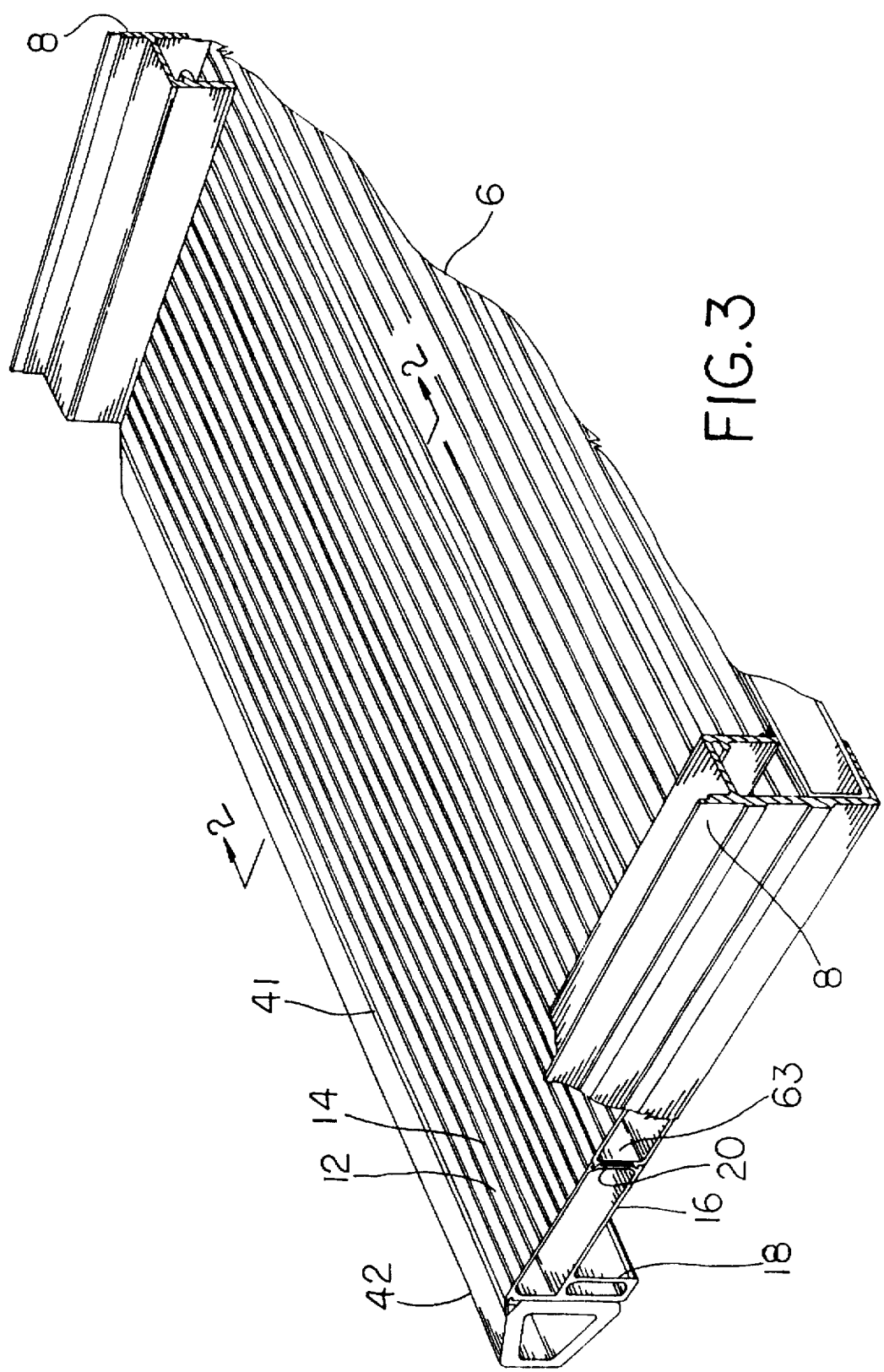
FIG. 3 is a fragmentary view in perspective of the improved end unit according to the present invention illustrating the sections of the modular floor spanning the distance between the frame of an enclosure such as a trailer.

As shown in FIGS. 2 and 3, end panel 10 is attached to modular floor panel 60, which is one of a plurality of identical floor panels forming trailer floor 6, which is mounted to support frame 8 of a horse trailer. Each modular panel 60 includes upper surface 61, lower surface 62, and a pair of ends 63, 64. The structure of end 64 is identical to that of attachment end 20 of end panel 10, and includes groove 65 and lip 66 on upper surface 61. Lower surface 62 of end 64 includes groove 69 and lip 70 having protrusion or detent 71. Upper surface 61 of end 63 includes lip 72, while lower surface 62 of end 63 includes flange 73. The structure of end 63 is designed to interlock with attachment end 20 of end panel 10.

In operation, trailer floor 6 is progressively assembled on frame 8 of a trailer by connecting a plurality of modular floor panels 60 to each other. End 64 of each panel 60 is secured to end 63 of an adjacent panel by placing lip 66 over lip 72 of end 63, and then pressing down on end 63 so that flange 73 is pressed into groove 69 and locked in place by detent 71. End panel 10 is connected to an adjacent floor panel 60 in a similar manner by placing lip 24 at end 20 of end panel 10 over lip 72 at end 63 of panel 60. End 22 is then pressed down so that flange 69 of panel 60 is forced into groove 28 of end panel 10 and secured by detent 32. Resilient bumper 42 is attached to mounting wall 37 by inserting self-tapping lag screws 49 through access hole 50, through mounting hole 52, and threaded into mounting hole 33 of rib 18. A wrench or other convention fastening means is inserted through access hole 50 in order to tighten screws 49. Tongue or lip 47 of sealing strip 41 is placed into groove 39 of end panel 10, and leg 43 is pushed down thus locking sealing strip 41 in pace with leg 43 over the joint between bumper 42 and end panel 10 and with leg 45 locked against end 22 of end panel 10.

It will be appreciated that the foregoing is presented by way of illustration only, and not by way of any limitation, and that various alternatives and modifications may be made to the illustrated embodiment without departing from the spirit and scope of the invention.

What is claimed:

1. An end unit for a modular floor of a vehicle, said end unit including a load bearing portion, a reinforcing rib extending along and integrated with said load bearing portion for stiffening said load bearing portion, a resilient bumper attached to said load bearing portion and extending along an edge of said load bearing portion, said bumper engaging said edge to define an interface therebetween, and a sealing member extending over the interface between said load bearing portion and said bumper for sealing the interface against the entry of moisture and contaminants.

2. The end unit as claimed in claim 1, wherein said sealing member is secured to said load bearing portion through an interlocking joint.

3. The end unit as claimed in claim 1, wherein said load bearing portion is secured to a mating surface of the modular floor through an interlocking joint.

4. The end unit as claimed in claim 1, wherein said reinforcing rib of said end unit includes an elongated internal cavity.

5. The end unit as claimed in claim 4, wherein said cavity is sealed.

6. The end unit as claimed in claim 1, wherein said sealing member is rigid.

7. The end unit as claimed in claim 1, wherein said load bearing portion includes an edge surface and a lip extending over the edge surface and cooperating therewith to define a groove therebetween, said sealing member including a tongue engaging said groove to secure said sealing member to the load bearing portion.

8. The end unit as claimed in claim 7, wherein said sealing member includes a pair of legs extending from said resilient bumper and terminating in said tongue.

9. The end unit as claimed in claim 1, wherein said rib extends along said edge of the load bearing portion, said bumper engaging said rib and said edge, and fastening means securing said bumper to said rib.

10. The end unit as claimed in claim 9, wherein said bumper includes an elongated internal chamber extending substantially parallel to said edge, said fastening means extending through a wall of said bumper and into said cavity whereby said fasteners are protected from the environment.

11. A modular floor system for attachment to a vehicle comprising, in combination, a modular floor having a plurality of interlocking load bearing sections, an end unit for attachment to said modular floor, said end unit including a load bearing portion, said end unit further including a reinforcing rib extending along and integrated with said load bearing portion for stiffening said load bearing portion, a resilient bumper attached to said load bearing portion of said end unit and extending along an edge of said load bearing portion, said bumper engaging said edge to define an interface therebetween, and a sealing member extending over the interface between said load bearing portion and said bumper for sealing the interface against the entry of moisture and contaminants.

12. The combination of claim 11, wherein said sealing member is secured to said load bearing portion through an interlocking joint.

13. The combination of claim 11, wherein said load bearing portion is secured to a mating surface of the modular floor through an interlocking joint.

14. The combination of claim 11, wherein said reinforcing rib of said end unit includes an elongated internal cavity.

15. The combination of claim 14, wherein said cavity is sealed.

16. The combination of claim 11, wherein said sealing member is rigid.

17. The combination of claim 11, wherein said load bearing portion includes an edge surface and a lip extending over the edge surface and cooperating therewith to define a groove therebetween, said sealing member including a tongue engaging said groove to secure said sealing member to the load bearing portion.

18. The combination of claim 17, wherein said sealing member includes a pair of legs extending from said resilient bumper and terminating in said tongue.

19. The combination of claim 11, wherein said rib extends along said edge of the load bearing portion, said bumper engaging said rib and said edge, and fastening means securing said bumper to said rib.

20. The combination of claim 19, wherein said bumper includes an elongated internal chamber extending substantially parallel to said edge, said fastening means extending through a wall of said bumper and into said cavity whereby said fasteners are protected from the environment.

21. An end unit for a modular floor of a vehicle, said end unit including a load bearing portion, a resilient bumper attached to said load bearing portion and extending along an edge of said load bearing portion, said bumper engaging said edge to define an interface therebetween, and a sealing member extending over the interface between said load bearing portion and said bumper for sealing the interface against the entry of moisture and contaminants.

22. The end unit as claimed in claim 21, wherein said load bearing portion includes a reinforcing rib extending along and integrated with said load bearing portion for stiffening said load bearing portion.

23. The end unit as claimed in claim 22, wherein said load bearing portion includes an edge surface and a lip extending over the edge surface and cooperating therewith to define a groove therebetween, said sealing member including a tongue engaging said groove to secure said sealing member to the load bearing portion.

24. The end unit as claimed in claim 23, wherein said sealing member includes a pair of legs extending from said resilient bumper and terminating in said tongue.

25. The end unit as claimed in claim 22, wherein said rib extends along said edge of the load bearing portion, said bumper engaging said rib and said edge, and fastening means securing said bumper to said rib.

26. The end unit as claimed in claim 25, wherein said bumper includes an elongated internal chamber extending substantially parallel to said edge, said fastening means extending through a wall of said bumper and into said cavity whereby said fasteners are protected from the environment.

* * * * *